United States Patent [19]

Diner

[11] Patent Number: 5,432,880
[45] Date of Patent: Jul. 11, 1995

[54] ANGLED OPTICAL CONNECTOR FERRULE

[75] Inventor: N. Fahri Diner, Carrollton, Ga.

[73] Assignee: AT&T Corp., Murray Hill, N.J.

[21] Appl. No.: 214,899

[22] Filed: Mar. 17, 1994

[51] Int. Cl.$^6$ ................................. G02B 6/00
[52] U.S. Cl. ........................... 385/85; 385/79
[58] Field of Search ..................... 385/79, 85

[56] References Cited

U.S. PATENT DOCUMENTS

| | | | |
|---|---|---|---|
| 4,084,308 | 4/1978 | Runge | 385/85 X |
| 4,280,365 | 4/1980 | Gross | 350/96.18 |
| 4,285,572 | 8/1981 | Beaudette et al. | 350/96.20 |
| 4,383,731 | 5/1983 | Simon et al. | 350/96.18 |
| 4,615,581 | 10/1986 | Morimoto | 350/96.21 |
| 4,634,214 | 1/1987 | Cannon, Jr. et al. | 350/96.20 |
| 4,702,556 | 10/1987 | Ishii et al. | 350/320 |
| 4,756,592 | 7/1988 | Sasayama et al. | 350/96.20 |
| 4,812,002 | 3/1989 | Koto et al. | 350/96.18 |
| 4,865,410 | 9/1989 | Estrada et al. | 350/96.20 |
| 4,883,342 | 11/1989 | Ishii et al. | 350/320 |
| 4,919,509 | 4/1990 | Miller et al. | 350/96.21 |
| 5,062,682 | 11/1991 | Marazzi | 385/85 |
| 5,082,378 | 1/1992 | Müller et al. | 385/85 X |
| 5,140,660 | 8/1992 | Takahashi | 385/79 |

*Primary Examiner*—Akm E. Ullah

[57] ABSTRACT

A method of producing an optical fiber ferrule having an angled, domed end face with the vertex of the dome and the axis of the fiber being substantially coincident. This result is achieved by orienting the ferrule and grinding the end face to a first angle relative to the ferrule axis, then orienting the ferrule at a second angle relative to the grinding surface and grinding the radius thereon.

7 Claims, 6 Drawing Sheets

ANGLED OPTICAL CONNECTOR FERRULE

FIELD OF INVENTION

This invention relates to optical fiber connectors for use in communications systems and, more particularly to a method of making a ferrule for use in such a connector.

BACKGROUND OF THE INVENTION

In optical fiber communications arrangements, there has been a steadily increasing improvement in the reduction of signal loss within the fiber itself but fiber signal loss is the major contributing factor to signal loss in long distance systems. Fiber losses can be compensated for by the use of fiber amplifiers. One critical loss factor is the quality of the coupling when two signal bearing fibers are connected together, inasmuch as the junction between the two fibers represents a discontinuity where signal losses can, and do occur.

In general, fibers are connected together in end-to-end, butting relationship by means of connectors having fiber holding ferrules therein. It is common practice to finish the end of each ferrule in a flat surface normal to the axis of the fiber whereby the flat faces of the two ferrules involved in a connection bear against each other, and hence, the fiber ends abut, often with an index matching gel therebetween. Such an arrangement is unsatisfactory for several reasons, among which are lack of parallelism of the ferrule end faces, non-concentricity of the fibers in the ferrules, and no physical fiber contact, and the necessity of re-applying index matching gel each time there is a disconnect-reconnect process. One solution to the problem of non-contact, has been to make the ferrule ends, and the fiber contained therein, convex or domed so that actual physical contact between the fibers occurs. Of even greater effect on the connection, however, is the Fresnel reflection at the end surfaces of the fibers, whereby reflected light is fed back within the fiber toward the signal source. Such reflection gives rise to signal loss, instabilities in the signal source, and a deterioration of the signal-to-noise (S/N) ratio.

One solution to the problem of Fresnel reflection is to form the end surface of each ferrule, and hence, the fiber end which is co-planar therewith, at an angle such that the signal reflection angle is greater than the fiber numerical aperture. Thus, when light is reflected at the interface, it does not travel back along the fiber but is, in effect, directed out the sides thereof in the form of leakage. There is, as a consequence, some small signal power loss, but source stability and S/N are improved. Such a beveled arrangement is becoming more and more popular, but it has certain inherent disadvantages, chief among which is the necessity of insuring that the butting angular faces of the two ferrules and their fibers are exactly parallel or as near thereto as can be realized given the normal manufacturing tolerances. For optimum signal transmission, the planar end faces of the fibers should be in full surface contact, and any such misalignment or non-parallelism prevents such contact. In U.S. Pat. No. 4,615,581 of Morimoto, there is shown an arrangement which overcomes, at least to some extent, the foregoing problem. In the arrangement disclosed in that patent, the ferrule end faces are normal to the ferrule axes, but each fiber axis is at an angle to its ferrule axis. Thus, although the fiber end face is coplanar with the ferrule end face, it is at the desired angle relative to the fiber axis to prevent light signal feedback resulting from Fresnel reflection. There still remains, however, the problem of alignment of the fiber ends. Any slight angular offset about its axis of a ferrule relative to the other ferrule can reduce the desired full surface contact of the fiber ends.

Because of the requirement of parallelism between beveled connector ferrule ends discussed in the foregoing, and physical contact requirement, it has been proposed that the ferrule end, and hence the fiber end, be ground to a convex or domed shape, with the high point or vertex of the dome shape coinciding with the optical axis of the fiber. With such a configuration, the faces of the two connecting ferrules abut at their vertices, thereby obviating the necessity of absolute parallelism characteristic of flat faces. When the vertices coincide with the optical axes of the fibers, good contact between fibers is assured, and, because the end faces are still beveled, the feedback from reflections is still minimized. Unfortunately, however, when such a ferrule face is ground to a beveled convex shape, it is not, using present grinding methods, possible to make the vertex of the dome and the optical axis coincide. As will be discussed more hilly hereinafter, the displacement of the vertex from the optic axis is a function of the diameter of the ferrule end, and coincidence occurs only when that diameter is zero, for face tilts other than zero degrees.

In U.S. Pat. No. 5,140,660 of Takahashi, there is shown a ferrule configuration specifically aimed at this problem. The solution proposed by Takahashi is a reduction in diameter of the end of the ferrule so that, when the face is ground in a convex shape, the apex of the dome approaches, but does not coincide with , the optic axis. The amount of the offset of the apex relative to the axis is, however, within acceptable tolerances. One problem with the Takahashi arrangement is that it requires a special ferrule shape having a reduced diameter tip joined to the rest of the ferrule by a tapered section. Such a ferrule "blank" is more expensive to produce than the normal, single diameter blank, which, when considered in light of the vast quantities of fiber optic connectors being manufactured and used at the present time, becomes an important economic factor. In addition, the tapered section, over an extended period of use including frequent connect-disconnect operations, tends to accumulate dirt which can ultimately result in signal loss or decreased S/N ratio. Thus, although the Takahashi arrangement is an improvement over prior art devices, it is relatively expensive, does not assure near perfect or perfect coincidence of the dome vertex with the optic axis, and is subject to, or causes, accumulation of dirt which can interfere with optimum signal transmission.

SUMMARY OF THE INVENTION

The present invention, in a preferred embodiment thereof, is a method of grinding or forming a convex end on a standard ferrule blank containing an optical fiber whereby the vertex of the dome thus formed coincides with the optical axis of the fiber.

The face of a standard ferrule having a chamfered end, for ease of insertion into the connector, is first ground to the desired angle for minimizing feedback, preferably approximately 8.6°. This is accomplished by means of a grinding fixture having one or more ferrule receiving bores therein at an angle of 8.6°, to the axis of the fixture, or 81.4° to the flat grinding surface.

After the substantially flat, angled end surface of the ferrule is achieved, the angle is then changed, preferably reduced to, in this example, 8.0° to the normal to the grinding surface, either by means of a second fixture having 8.0° bores therein, or by changing the angle of the grinding surface to the axis of the fixture. The end surface of the ferrule is then radiused using an elastic or yieldable grinding surface, such as is shown in the aforementioned Takahashi patent. Preferably, the grinding operation is performed in a series of steps using successively smaller grinding diamond particle polishing films until approximately zero offset of the dome apex from the optical fiber axis is achieved.

The process produces a ferrule and fiber insert having a convex end surface with minimal offset using a standard, commercially available ferrule, at a considerable cost saving. By considerable saving is meant a few dollars per ferrule, which becomes an important economic factor in view of the enormous numbers of such ferrules, i.e., several million, being manufactured today.

The principles and features of the present invention will be more readily apparent and understood frown the following detailed description, read in conjunction with the accompanying drawings.

DETAILED DESCRIPTION

Figure 1:
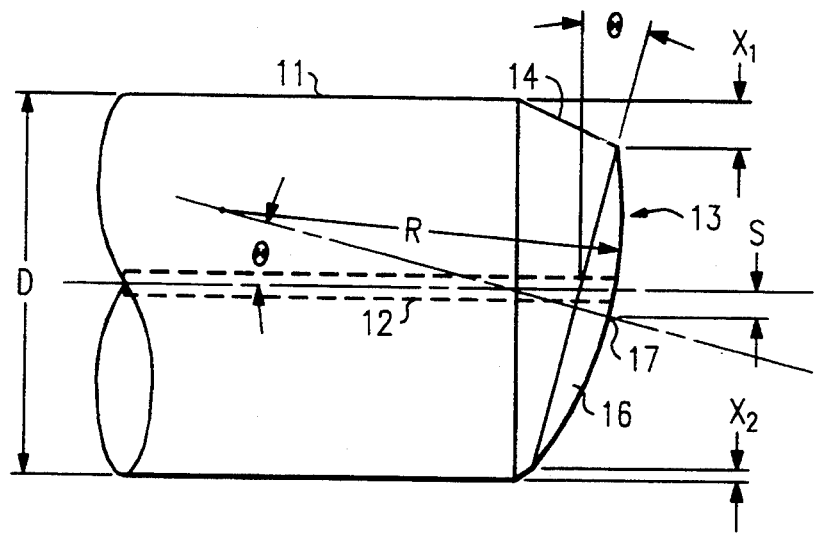
FIG. 1 is an elevation view of the end portion of an optical fiber containing ferrule ground in accordance with the prior art methods.

The ferrule of FIG. 1, the end face of which is ground in accordance with prior art methods, comprises a cylindrical ferrule body 11 of diameter D containing along its axis an optical fiber 12. Prior to the grinding of the end face 13 the ferrule end has formed thereon a chamfer or taper 14 of approximately 30°, for facilitating insertion of the ferrule into the connector sleeve (not shown) in which it is carried. As was discussed hereinbefore, the end face 13 is ground at an angle $\theta$, approximately 8.6°, to prevent Fresnel reflections from propagating back to the source, and is radiused to form a convex dome portion 16 of radius R to eliminate the need for parallelism in abutting ferrules, also as has been explained hereinbefore.

Figure 6:
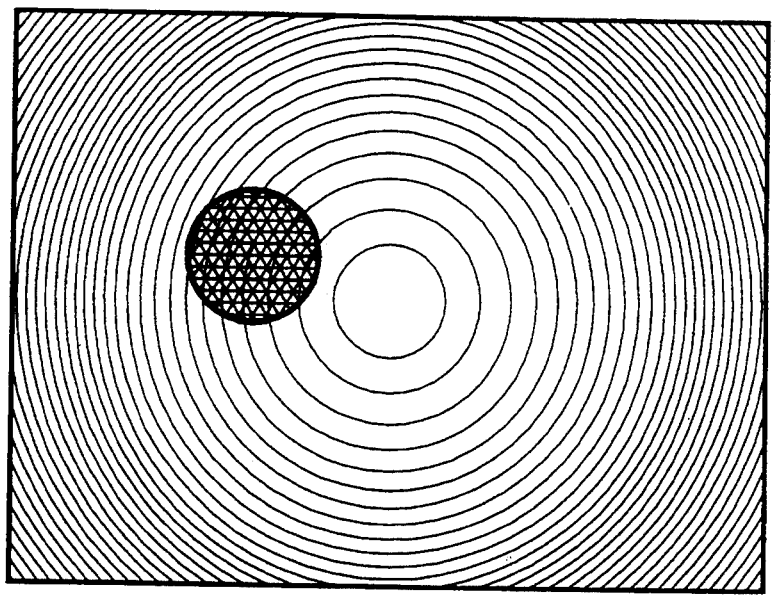
FIG. 6 is a photomicrograph of the end of the ferrule of FIG. 1.

Ideally, the vertex of the domed portion 16 should coincide with the axis (and the end) of optical fiber 12. However, as shown in FIG. 1, the vertex 17 of the dome 16 is offset from the fiber axis by a distance S. In mathematical terms, the offset S is given by the equation:

$$S = \sin\Theta \left[ R \sqrt{R^2 - \frac{D^2}{4}} \right] + \frac{x_1 - x_2}{2} \quad (1)$$

where $x_1$, and $x_2$ are the remaining portions of the chamfer 14 after grinding. It can be seen from equation (1) that S will always be present, in greater or lesser degree, and can never equal zero, which is the ideal. The value of the term $x_1-x_2$ can be reduced by reducing the angle $\Theta$, but this, in turn, has the effect of increasing Fresnel reflection effects. In FIG. 6 is shown the result of grinding the ferrule of FIG. 1 by the prior art method. The dark spot at the center of the concentric rings is the vertex 17 of the domed portion 16, and the offset dark spot is the end of the optical fiber 12. It can be appreciated that the vertex 17 of one ferrule will abut the corresponding vertex of a mating ferrule, thereby preventing full abutting contact of the ends of the optical fibers. This is alleviated, at least to some extent, by the fact that the ferrules themselves, which may be made of ceramic, plastic, or metal, have some elasticity and thus may be compressed together to flatten the domes 16 to some extent, thus achieving some contact between fiber ends. This is not, however, a reliable solution to the offset problem.

Figure 2:
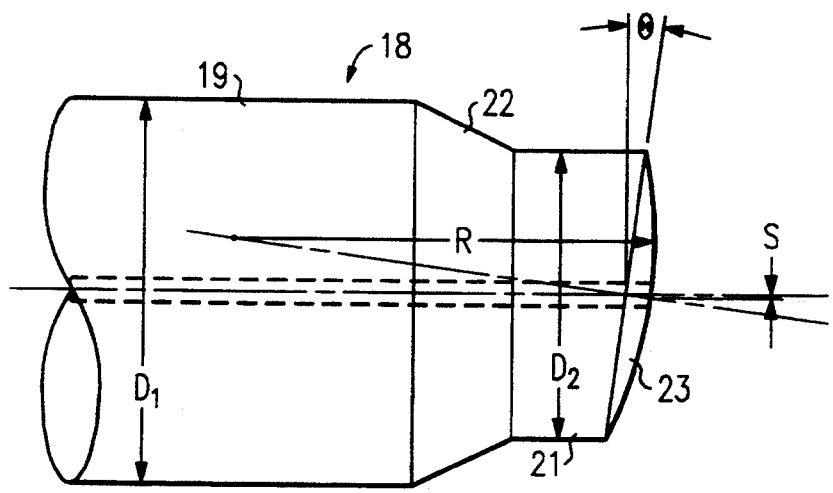
FIG. 2 is an elevation view of the end portion of an optical fiber containing ferrule ground in accordance with the teachings of U.S. Pat. No. 5,140.660 of Takahashi.

The ferrule 18 of FIG. 2, the Takahashi ferrule, has a first portion 19 of a diameter $D_1$ and a second portion 21 of diameter $D_2$, joined by a beveled or chamfered section 22. The end of portion 21 is ground at an angle $\Theta$, preferably 8.6°, and then radiused by radius R to produce a domed section 23. It can be seen that such an arrangement, when ground, eliminates the $x_1-x_2$ term of equation (1) inasmuch as there is no chamfered portion, the chamfer in effect being at the bevel 22. Furthermore, the diameter expression $D^2$ in equation (1) has been reduced by making $D_2$ less than $D_1$. As a consequence, the offset S is materially reduced, although it can only be zero if $D_2$ is equal to zero, or if the angle $\Theta$ is zero.

Figure 7A:
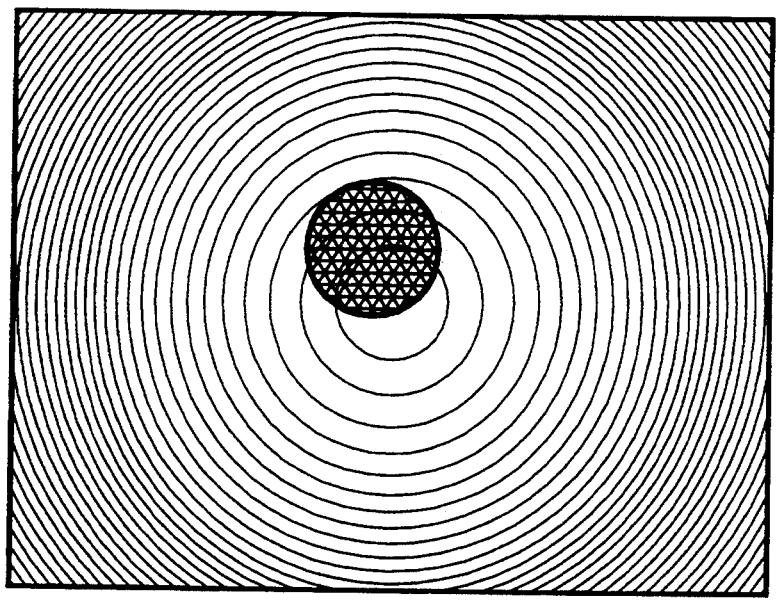
FIGS. 7A, 7B, and 7C are photomicrographs of three different ferrule ends ground in accordance with the method of the Takahashi patent.
Figure 7B:
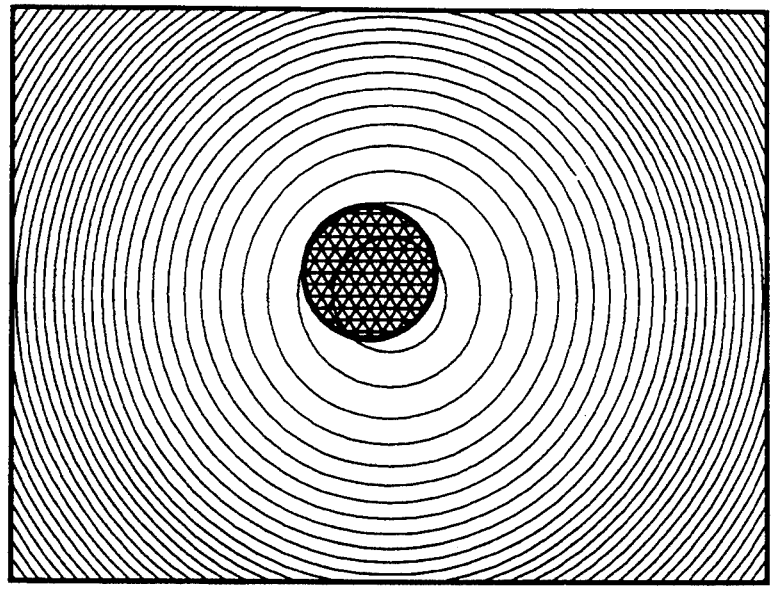
Figure 7C:
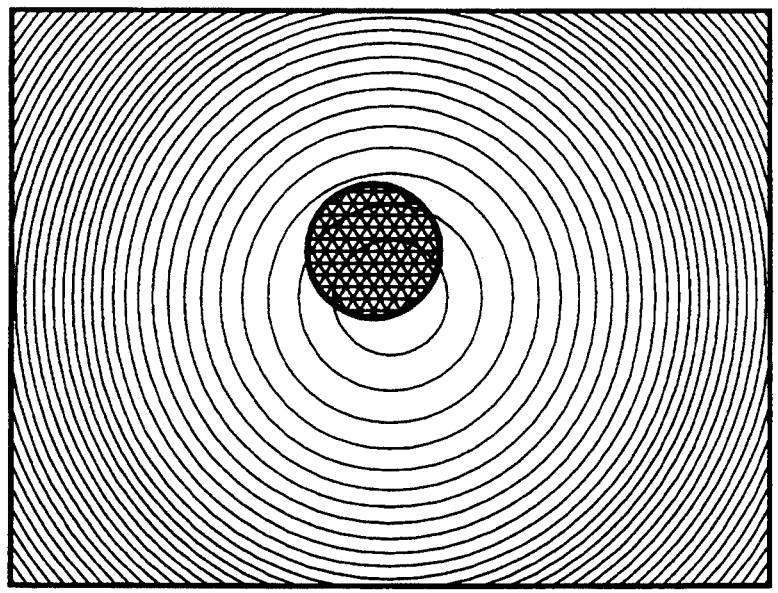

FIGS. 7A, 7B and 7C are photomicrographs of several ferrule ends ground in accordance with the teachings of the Takahashi patent. It can be seen that there is a marked reduction in the offset or eccentricity S, to where there is some overlap of the optical fiber with the vertex of the radiused ferrule end, but, as can be seen, there is variation among the samples, and in no case is there coincidence of fiber axis and vertex.

Figure 3:
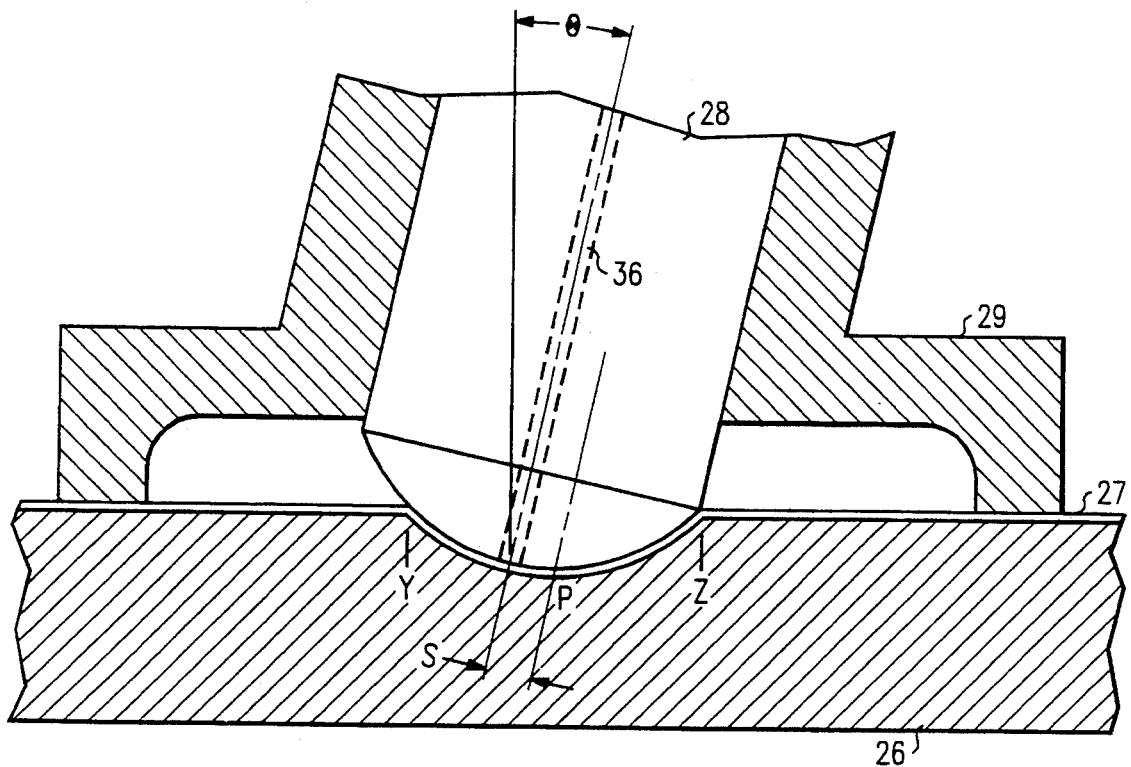
FIG. 3 is a cross-section, elevation view of the prior art method of radiusing the end face of the ferrule, used in producing the ferrules of FIGS. 1 and 2.

Both the ferrules depicted in FIGS. 1 and 2 were ground in accordance with the prior art method, as depicted in FIG. 3. The arrangement of FIG. 3, which is an exaggeration of the actual arrangement and which is for illustrative purposes only and is not intended to depict any one particular arrangement, comprises a polishing disc or wheel 26 of elastic material having a polishing compound film or layer 27 affixed to one surface thereof. The ferrule 28 to be radiused is held at an angle $\Theta$, preferably 8.6°, within a fixture 29 so that the end of the ferrule contacts the polishing or grinding film 27 at the angle $\Theta$ as shown. As the grinding wheel 26 rotates, material is removed from the ferrule end fact to impart the radius thereto. The vertex of the radius is at the mid-point P of the distance between points Y and Z, which define the limits of contact of the ferrule with the polishing surface, and, as can be seen, point P is offset from the axis of the fiber 31 contained in the ferrule by the distance S. Thus, FIG. 3 is a graphic depiction of equation (1). As pointed out hereinbefore, the distance S can be decreased by a decrease in the ferrule diameter, or by a decrease in the angle Θ. However, there are obvious limits on decreasing the diameter, and decreasing Θ gives rise to Fresnel reflections, thereby defeating the purpose of the angular relationship between optic axis of the fiber and its end face.

Figure 4:
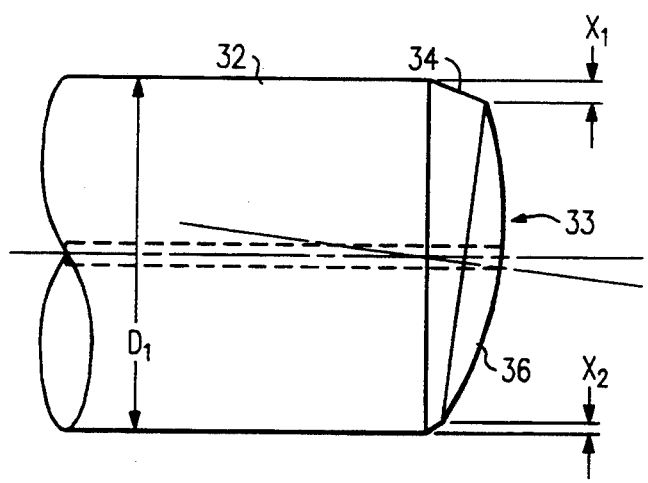
FIG. 4 is an elevation view of the end portion of an optical fiber containing ferrule ground in accordance with the method of the present invention.
Figure 8:
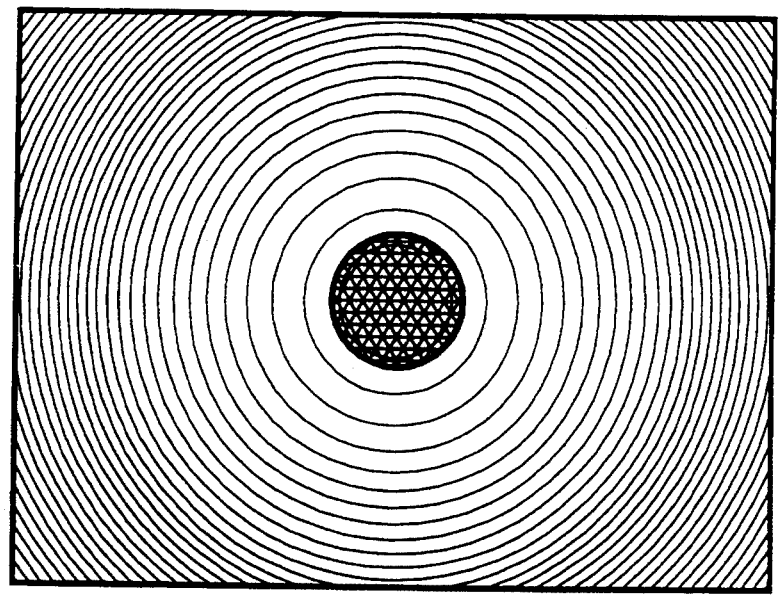
FIG. 8 is a photomicrograph of the end of the ferrule of FIG. 4 ground in accordance with the method of the present invention.

In FIG. 4 there is shown a ferrule 32 having an end face 33 which comprises a chamfered portion 34 and a radiused or domed portion 36, ground by the method of the present invention. As can be seen in FIG. 4, the dimension S, i.e., the offset between the dome vertex and the optical fiber axis, is zero. In FIG. 8, which is a photomicrograph of the end face of ferrule, it can be seen that the dome vertex and the optical fiber end are coincident, which is a marked improvement over the results shown in FIGS. 7A, 7B, and 7C. Furthermore, as will be apparent hereinafter, this coincidence is reproducible without any substantial variation, such as the variations shown in FIGS. 7A, 7B, and 7C.

Figure 5A:
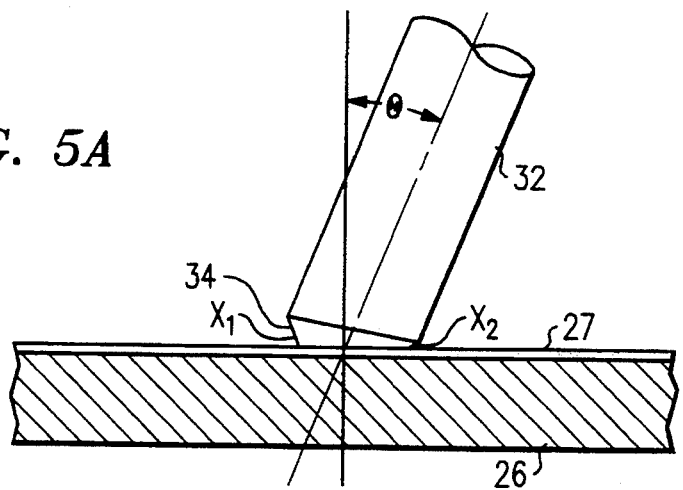
FIGS. 5A, 5B, and 5C are views of different stages in the grinding of the end of the ferrule of FIG. 3.
Figure 5B:
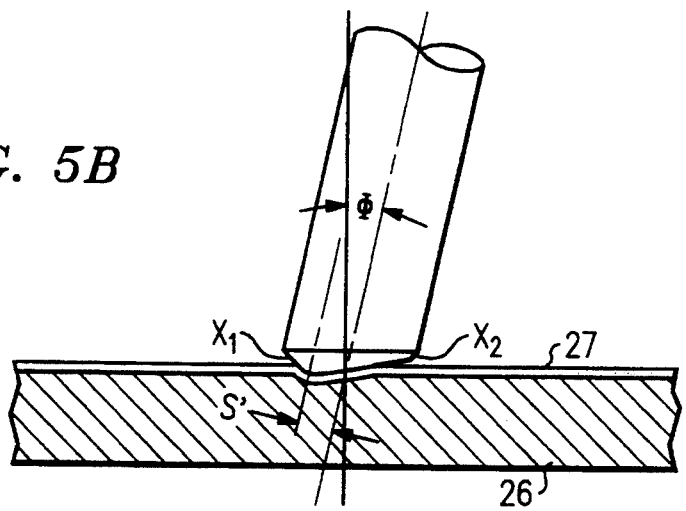
Figure 5C:
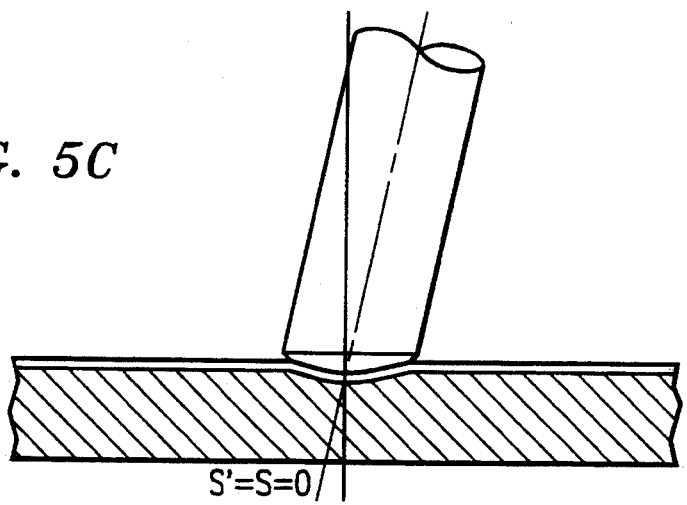

With reference to FIGS. 5A, 5B, and 5C, wherein, for a better understanding of the invention, the angles are exaggerated, the end of fiber containing ferrule 32 is ground and polished at an angle Θ, preferably 8.6°, as shown in FIG. 5A. Prior to grinding and polishing, the ferrule was a typical, commercially available zirconia blank having a chamfer 34 at its end. After grinding and polishing, ferrule 32 has a flat, angled end face and chamfer 34 has a portion $x_1$ on one side of the centerline which is larger than a portion $x_2$ on the opposite side of the centerline.

Ferrule 32 is then tilted at an angle Φ relative to the normal to the polishing surface 27, either by placement in a different grinding fixture (not shown), or the same grinding fixture (not shown) having separate angled bores therein, or by tilting the grinding wheel relative to the angular orientation of the ferrule within its fixture. Angle Φ is preferably less than angle Θ, although, under some circumstances it might be greater. The end face of the ferrule is then radiused, as shown in FIGS. 5B and 5C. However, as can best be seen in FIG. 5B, the initial material removal and radiusing occurs at that portion of the end face where the larger chamfer $x_1$ exists. As can be seen in FIG. 513, the vertex of the radius or dome occurs on the other side of the ferrule centerline than is shown in FIG. 3, and is offset from the centerline by the distance $S_1$.

As more material is removed, the distance $S_1$ decreases until it becomes substantially equal to zero, as shown in FIG. 5C, and there is coincidence between the fiber axis and the vertex of the radius or dome, as shown in FIG. 8, which is the desired configuration. In the production of the radiused ferrule 32 of FIGS. 4 and 8, the following steps and parameters may be used.

1. Grind the ferrule at an 8.6±0.2 degree angle.
2. Radius the pre-angle using
   a. a 6 micron diamond polishing film at 150 gr/mm² pressure for 45 seconds;
   b. a 3 micron diamond polishing film at 150 gr/mm² pressure for 30 seconds:
   c. a 1 micron diamond polishing film at 150 gr/mm² pressure for 60 seconds; and
   d. a 0.3 micron aluminum oxide polishing film at 150 gr/mm² for 3 seconds.

The method of producing a ferrule having an angled, domed end face as shown and described herein results in approximately a one hundred percent coincidence of the radius vertex and the fiber axis, requires no special ferrule blanks, and is consistent in result. The method is relatively simple and quickly accomplished. Ferrules made with the present method assure good contact and registration between the fibers of mating ferrules without the necessity of compressing the ferrule ends, and despite temperature variations or extremes.

The foregoing has been illustrative of the features and principles of the present invention. Various changes or modifications of the method of the invention or the product produced thereby might occur to workers in the an without departure from the spirit and scope of the invention.

I claim:

1. A method of forming an end face of an optical connector ferrule having an optical fiber axially disposed therein, comprising the steps of:
   grinding the end face of the ferrule at a first angle relative to an axis of said ferrule, with the axis of the ferrule being oriented at said first angle relative the normal to a grinding surface;
   orienting the ferrule at a second angle different from said first angle relative to the normal to the grinding surface;
   forming a curved portion having a radius on the end face of the ferrule with the grinding surface wherein initially an axis of the optical fiber and a vertex of the radius are offset from each other; and
   continuing to form the radius until the vertex of the curved portion of the end face and the axis of the optical fiber are substantially coincident.

2. The method as claimed in claim 1 wherein said second angle is less than said first angle.

3. The method as claimed in claim 2 wherein said first angle is greater than the fiber numerical aperture.

4. The method as claimed in claim 2 wherein said first angle is 8.6°±0.2° and said second angle is 8.0°±0.1, 5. A method of forming an end face of an optical connector ferule having an optical fiber axially disposed therein, the ferrule having a chamfer, said method comprising the steps of:
   grinding the end face of the ferrule at a first angle relative to an axis of said ferrule with the axis of the ferrule being oriented at said first angle relative to the normal to a grinding surface, said grinding step producing less chamfer on one side of the ferrule axis than on the opposite side thereof:
   forming a curved portion having a radius on the end face of the ferrule by initially grinding material from the one side of the ferrule having the larger chamfer; and
   continuing to form the curved portion until a vertex of the curved portion substantially coincides with the axis of the optical fiber.

6. The method as claimed in claim 5 wherein the step of grinding material from the one side of the ferrule having the larger chamfer includes tilting the ferrule to a second angle relative to the normal to the grinding surface wherein said second angle is different from said first angle.

7. The method as claimed in claim 6 wherein the second angle is less than the first angle.

* * * * *